(12) United States Patent
Wang et al.

(10) Patent No.: US 10,323,751 B2
(45) Date of Patent: Jun. 18, 2019

(54) SEAL ASSEMBLY FOR A SUBMERSIBLE PUMPING SYSTEM AND AN ASSOCIATED METHOD THEREOF

(71) Applicant: General Electric Company, Schenectady, NY (US)

(72) Inventors: Jifeng Wang, Niskayuna, NY (US); Omprakash Samudrala, Clifton Park, NY (US)

(73) Assignee: General Electric Company, Shenectady, NY (US)

( * ) Notice: Subject to any disclaimer, the term of this patent is extended or adjusted under 35 U.S.C. 154(b) by 534 days.

(21) Appl. No.: 14/959,137

(22) Filed: Dec. 4, 2015

(65) Prior Publication Data

US 2017/0159826 A1    Jun. 8, 2017

(51) Int. Cl.
| | |
|---|---|
| F04D 13/08 | (2006.01) |
| F16J 15/46 | (2006.01) |
| E21B 43/12 | (2006.01) |
| E21B 4/04 | (2006.01) |

(52) U.S. Cl.
CPC ............... *F16J 15/46* (2013.01); *E21B 4/04* (2013.01); *E21B 43/128* (2013.01)

(58) Field of Classification Search
CPC ........ C22F 1/006; F04D 13/08; F04D 13/086; E21B 43/128
See application file for complete search history.

(56) References Cited

U.S. PATENT DOCUMENTS

| | | | |
|---|---|---|---|
| 2,715,687 A | 8/1955 | Makous | |
| 4,837,068 A | 6/1989 | Martin et al. | |
| 4,940,911 A | 7/1990 | Wilson | |
| 5,171,024 A | 12/1992 | Janocko | |
| 6,046,521 A | 4/2000 | Heinig | |
| 6,100,616 A * | 8/2000 | Heinig | E21B 41/00 |
| | | | 310/112 |
| 6,268,672 B1 | 7/2001 | Straub et al. | |
| 6,307,290 B1 | 10/2001 | Scarsdale | |
| 6,537,628 B1 | 3/2003 | Bruewer et al. | |
| 7,373,991 B2 | 5/2008 | Vaidya et al. | |

(Continued)

FOREIGN PATENT DOCUMENTS

| | | |
|---|---|---|
| EP | 1239118 A2 | 9/2002 |
| WO | 2015094897 A1 | 6/2015 |

OTHER PUBLICATIONS

Changkuan, "Design of an electronically-actuated gas lift safety valve," M.S. Thesis, Massachusetts Institute of Technology, Dept. of Mechanical Engineering, 2013, pp. 1-99.

(Continued)

*Primary Examiner* — Patrick Hamo
(74) *Attorney, Agent, or Firm* — Baker Hughes Patent Operations

(57) ABSTRACT

A seal assembly for a submersible pumping system is presented. The seal assembly includes a housing and a support tube disposed within the housing. Further, the seal assembly includes a shape memory alloy (SMA) foil disposed within the housing, surrounding the support tube to define a first chamber between the shape memory alloy foil and the support tube. The first chamber is configured to store a motor fluid, and wherein the shape memory alloy foil is configured to restrict a flow of a wellbore fluid to the motor fluid.

20 Claims, 12 Drawing Sheets

(56) References Cited

U.S. PATENT DOCUMENTS

| | | | |
|---|---|---|---|
| 7,687,571 B2 | 3/2010 | Vaidya et al. | |
| 7,743,825 B2 | 6/2010 | O'Malley et al. | |
| 7,854,264 B2 * | 12/2010 | Mandrou | F16L 55/05 166/212 |
| 8,246,052 B1 | 8/2012 | Marvel, III | |
| 8,246,326 B2 | 8/2012 | Royzen | |
| 8,690,551 B1 | 4/2014 | Royzen et al. | |
| 8,739,408 B2 | 6/2014 | Duan et al. | |
| 2006/0245957 A1 | 11/2006 | Berry et al. | |
| 2014/0209291 A1 | 7/2014 | Watson et al. | |
| 2017/0159414 A1 | 6/2017 | Samudrala et al. | |

OTHER PUBLICATIONS

PCT Preliminary Report on Patentability issued in connection with corresponding PCT Application No. PCT/US2016/064141 dated Jun. 14, 2018.

* cited by examiner

SEAL ASSEMBLY FOR A SUBMERSIBLE PUMPING SYSTEM AND AN ASSOCIATED METHOD THEREOF

CROSS-REFERENCE TO RELATED APPLICATIONS

This application is related to U.S. patent application entitled "Seal Assembly for a Submersible Pumping System and an associated Method thereof" filed concurrently herewith under Ser. No. 14/959,084.

BACKGROUND

Embodiments of the present invention relate generally to a submersible pumping system and more particularly to a seal assembly in an electric submersible pumping system.

Typically, a submersible pumping system is widely used to obtain one or more fluids from subterranean reservoirs to the surface of the earth. In general, the submersible pumping system includes assemblies, such as a pump assembly, a seal assembly, and a motor assembly that are deployed into wells to recover the fluids from the subterranean reservoirs. Such assemblies include one or more components that are engineered to withstand an inhospitable downhole environment, such as wide ranges of temperature, pressure, and corrosive well fluids.

Furthermore, in submersible pumping systems with an electric drive, a dielectric fluid is employed within the motor assembly for insulation, lubrication and as a coolant. However, in certain environments, contaminated wellbore fluids may ingress into the motor fluid and may affect properties of the motor fluid. In one example, the properties of the motor fluid include favorable lubrication, dielectric strength, and chemical compatibility of the motor fluid.

In a conventional submersible pumping system, a motor protector is used to shield the motor from the wellbore fluids. Also, the motor protector is used to equalize pressure between the motor fluid and the wellbore fluids as well as to provide space for the motor fluid to expand and contract in response to thermal changes. However, under high temperature, parts of the motor protector may become permeable to water molecules in the wellbore fluids. The water molecules leak or diffuse from the wellbore fluids into the motor fluid, thereby degrading the dielectric strength of the motor fluid.

BRIEF DESCRIPTION

In accordance with aspects of the present specification, a seal assembly for a submersible pumping system is presented. The seal assembly includes a housing and a support tube disposed within the housing. Further, the seal assembly includes a shape memory alloy (SMA) foil disposed within the housing, surrounding the support tube to define a first chamber between the shape memory alloy foil and the support tube. The first chamber is configured to store a motor fluid, and wherein the shape memory alloy foil is configured to restrict a flow of a wellbore fluid to the motor fluid.

In accordance with a further aspect of the present specification, a method for restricting a flow of a wellbore fluid to a motor fluid is presented. The method includes disposing a support tube within a housing. Further, the method includes disposing a shape memory alloy (SMA) foil within the housing, surrounding the support tube to define a first chamber between the shape memory alloy foil and the support tube. The first chamber is configured to store a motor fluid, and wherein the shape memory alloy foil is configured to restrict a flow of the wellbore fluid to the motor fluid.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of a system and method for isolating a motor fluid from a wellbore fluid while compensating for any pressure and volume changes are disclosed. In particular, an electric submersible pumping system and method disclosed herein employ a seal assembly that acts as a physical barrier between the wellbore fluid and the motor fluid. The seal assembly is capable of restricting the flow of wellbore fluids into the motor fluid even under extreme temperature and pressure conditions. Additionally, the seal assembly provides other preferred functions, such as transmitting torque between a motor assembly and a pump assembly, protecting the motor assembly from axial thrust imparted by the pump assembly, and accommodating expansion and contraction of the motor fluid as the electric motor operates through thermal cycles during operation.

Figure 1:
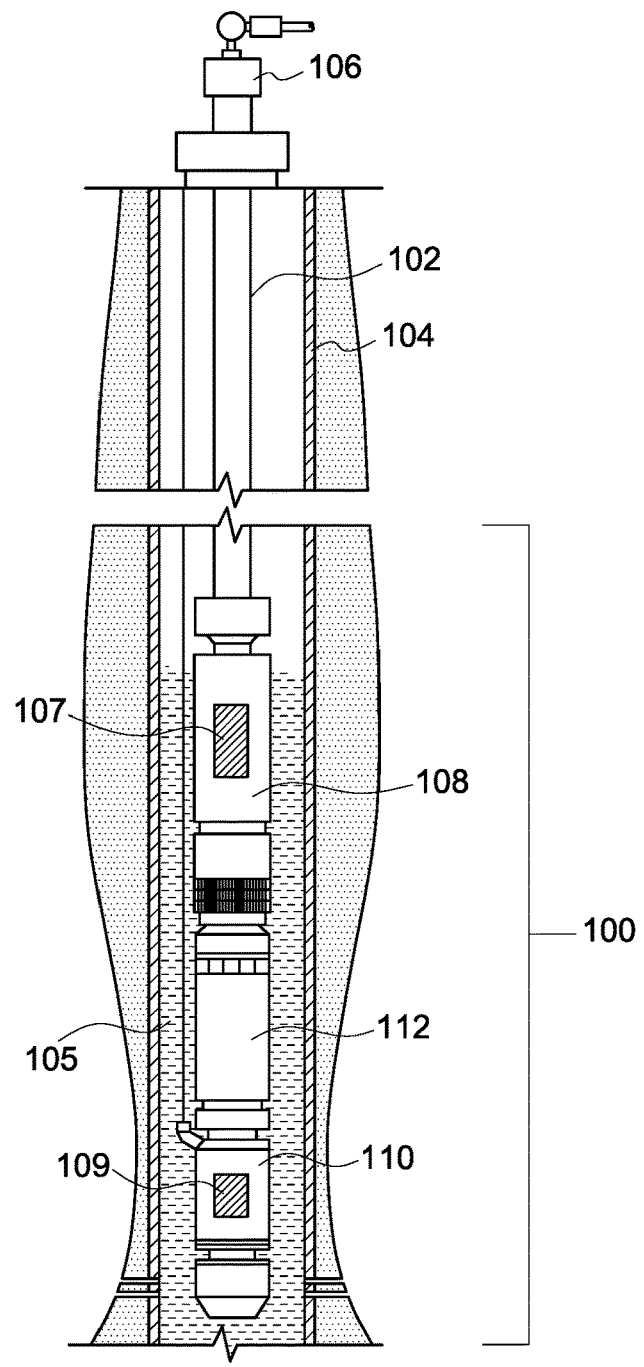
FIG. 1 is a sectional view of a submersible pumping system coupled to a production tubing in accordance with an exemplary embodiment of the present invention.

FIG. 1 is a sectional view of a pumping system 100 coupled to a production tubing 102 in accordance with an exemplary embodiment of the present invention. The pumping system 100 is coupled to a wellhead 106 located on a surface of earth via the production tubing 102. The production tubing 102 and the pumping system 100 are deployed in a wellbore 104 to extract fluid such as water and/or petroleum from subterranean reservoirs. It may be noted herein that the fluid in the wellbore 104 may be referred to as a wellbore fluid 105. In one example, the wellbore fluid 105 may include mineral hydrocarbons, such as crude oil, gas, and combinations of oil and gas. Also, the wellbore fluid 105 may include other ingredients, such as water molecules that may contaminate a motor fluid (not shown in FIG. 1) of the pumping system 100. Although the illustrated pumping system 100 is a submersible pumping system, it may be noted that the pumping system 100 may be used for other applications, such as surface pumping operations.

In a presently contemplated configuration, the pumping system 100 includes a pump assembly 108, a motor assembly 110, and a seal assembly 112. It may be noted herein that the pumping system 100 may include other components and is not limited to the components shown in FIG. 1. Further, the pump assembly 108 includes a pump 107 that is activated or operated to pump the wellbore fluid 105 to the surface of the earth. The motor assembly 110 includes an electric motor 109 that receives electrical power from a motor control unit (not shown) positioned on the surface of the earth. The received electrical power energizes the electric motor 109 which drives a shaft (not shown) to operate the pump 107.

Furthermore, the seal assembly 112 is positioned between the motor assembly 110 and the pump assembly 108 to protect the electric motor 109 from the environment in the wellbore 104. In one embodiment, the seal assembly 112 includes a support tube (not shown in FIG. 1) that is positioned surrounding the shaft coupled between the electric motor 109 and the pump 107. The seal assembly 112 is also used to protect the motor assembly 110 from mechanical thrust produced by the pump assembly 108. Additionally, the seal assembly 112 contains a pressure/volume compensator for the motor fluid that is within the electric motor 109 of the motor assembly 110. In one embodiment, the motor fluid is used to insulate lubricate and/or cool the electric motor 109 of the motor assembly 110.

In conventional pumping systems, a motor protector is used to shield the motor from the wellbore fluids. However, during high temperature conditions, the motor protector may become permeable to high temperature water molecules in a wellbore fluid. Hence, water molecules leak or diffuse from the wellbore fluids to the motor fluid, thereby degrading a dielectric strength of the motor fluid, which can eventually result in motor failure. Additionally, degradation of the motor fluid may affect the performance of the submersible pumping system.

In accordance with the embodiments of the present invention, the seal assembly 112 includes a seal bag arrangement that aids in isolating the motor fluid from the wellbore fluid 105 even under extreme thermal changes in the wellbore 104. In one example, the thermal changes in the wellbore 104 may be caused by the operation of the motor assembly 110. It may be noted that the seal bag arrangement may be one type of the pressure/volume compensator in the seal assembly 112.

The motor fluid is isolated from the wellbore fluid 105 by the seal assembly 112 even under extreme conditions of temperature and pressure of the motor assembly 110 and/or the wellbore fluid 105. As a result, degradation of the dielectric strength of the motor fluid is prevented.

Figure 2:
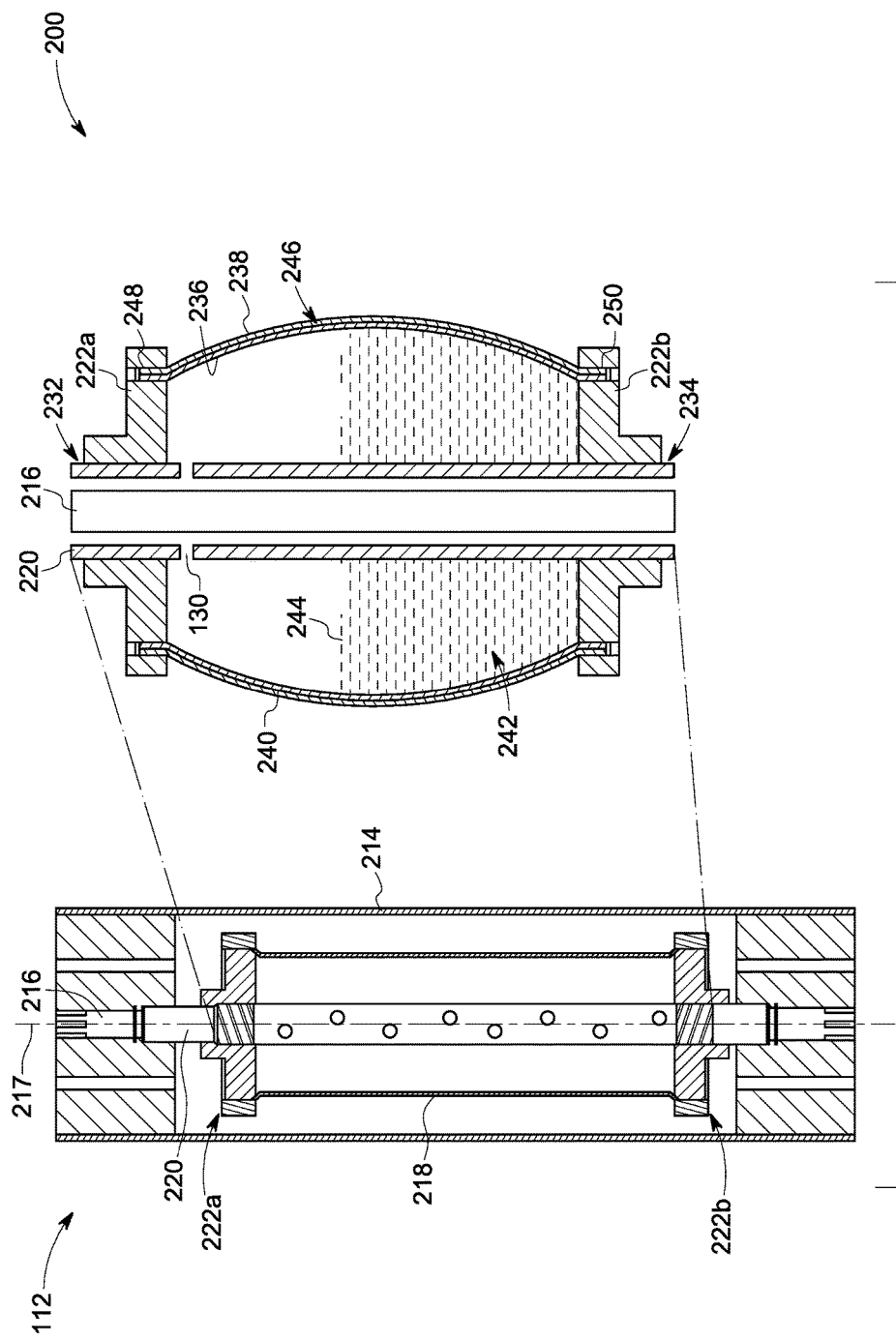
FIG. 2 is a cross-sectional view of a seal assembly in a submersible pumping system in accordance with one embodiment of the present invention.

Referring now to FIG. 2, a cross-sectional view of a portion of the seal assembly 112 in accordance with one embodiment of the present invention is depicted. The seal assembly 112 includes a housing 214, a shaft 216, a seal unit 218, a support tube 220, a first plate 222a, and a second plate 222b. It may be noted that only a portion of the seal assembly 112 is shown in FIG. 2. Also, it may be noted that the seal assembly 112 may include other components such as shaft seals, labyrinth chambers, thrust bearings etc., and is not limited to the components shown in FIG. 2.

In the illustrated embodiment, the shaft 216 is extended through the seal assembly 112 along a shaft axis 217 to couple the motor assembly to the pump assembly. The support tube 220 is a cylindrical tube that surrounds the shaft 216 that extends through the seal assembly 112. The seal unit 218 is coupled or secured to a first end 232 and a second end 234 of the support tube 220. More specifically, the first plate 222a is provided to secure one end of the seal unit 218 to the first end 232 of the support tube 220. In a similar manner, the second plate 222b is provided to secure other end of the seal unit 218 to the second end 234 of the support tube 220.

In the exemplary embodiment, the seal unit 218 includes a first bag 236, a second bag 238, and an impermeable device 240. It should be noted herein that the seal unit 218 may be installed at other suitable locations in the pumping system 100. For example, it may be desirable to integrate the seal assembly 112 within the motor assembly 110 or the pump assembly 108. In one embodiment, the seal unit 218 may include multiple seal bags coupled in series or in parallel to increase the available compensation volume and/or to provide an additional barrier against contamination.

The first and second bags 236, 238 are flexible cylindrical bags, for example, that are capable of expanding and contracting in response to changes in volume of a motor fluid caused by thermal changes in the wellbore. In one embodiment, the first and second bags 236, 238 are polymers bags that are fabricated from materials, such as perfluoroalkoxy alkanes (PFA), polytetrafluoroethylene (PTFE), polyether ether ketone (PEEK), polyphenylene sulfide (PPS), tetrafluoroethylene propylene (Aflas), fluoroelastomer (Viton), and highly saturated nitrile (HSN). In the exemplary embodiment, the first bag 236 is positioned within the second bag 238. The impermeable device 240 is positioned between the first bag 236 and the second bag 238 to form a seal arrangement. More specifically, the first bag 236 is positioned surrounding the support tube 220 to define a first chamber 242 between the first bag 236 and the support tube 220. The first chamber 242 is used for storing a motor fluid 244. Further, the second bag 238 is positioned surrounding the first bag 236 to define a second chamber 246 between the first bag 236 and the second bag 238.

Furthermore, the impermeable device 240 is disposed in the second chamber 246 between the first bag 236 and the second bag 238. The impermeable device 240 acts as a physical barrier to isolate high temperature water molecules that diffuse through walls of the polymer bag into the motor fluid 244 from the wellbore fluid. In the embodiment of FIG. 2, the impermeable device 240 is a metal foil that is positioned surrounding the first bag 236. It should be noted herein that the terms "impermeable device" and "metal foil" may be used interchangeably. The illustrated metal foil is a single piece structure. In one embodiment, the metal foil may be fabricated from materials, such as stainless steel, Inconel, or the like. Moreover, the metal foil may be a thin sheet that is disposed around the first bag 236 to shield the motor fluid 244 in the first chamber 242 from the wellbore fluid 104 that contains one or more deleterious ingredients.

The first plate 222a is coupled to the first end 232 of the support tube 220 and a first end 248 of the first and second bags 236, 238. Similarly, the second plate 222b is coupled to the second end 234 of the support tube 220 and a second end 250 of the first and second bags 236, 238. In other words, the first and second bags 236, 238 are attached to the first and second plates 222a, 222b. In one embodiment, the first and second plates 222a, 222b includes metal rings. In one embodiment, the first and second bags 236, 238 are polymer bags capable of expanding and contracting in response to expansion and contraction of the motor fluid 244 in the first chamber 242. The metal foil 240 is flexible and capable of expanding and contracting along with the first and second bags 236, 238. In one embodiment, the metal foil 240 may have a thickness in a range from about 0.5 mm to about 3 mm. Each of the first and second bags 236, 238 may have a thickness in a range from about 5 mm to about 25 mm.

During operation of the pumping system, the motor fluid 244 in the first chamber 242 may expand or contract in response to thermal changes due to startup, shutdown and/or other transients in the wellbore. In one embodiment, when the electric motor is started, the motor fluid may be heated due to losses in energy conversion and transmission from the motor assembly to the pump assembly. As a result, the motor fluid 244 in the first chamber 242 may be expanded. As the motor fluid 244 expands, the impermeable device 240 and the first and second bags 236, 238 also expand to provide space for expansion of the motor fluid 244. The impermeable device 240 ensures that the wellbore fluid is not permeated into the motor fluid 244 in the first chamber 242. Specifically, the impermeable device 240 prevents ingress of water molecules of the wellbore fluid to the motor fluid 244. Hence, the motor fluid 244 is not contaminated by the water molecules of the wellbore fluid even at high temperatures.

Further, when the electric motor is shutdown, temperature of the motor fluid 244 in the first chamber 242 reduces, which in turn causes the motor fluid 244 to contract in the first chamber 242. As the motor fluid 244 contracts, the impermeable device 240 and the first and second bags 236, 238 also collapse to accommodate a change in the volume of the motor fluid 244. The compliance of the seal bag arrangement ensures that the motor fluid pressure is always equalized to the well-bore fluid pressure.

Thus, even when there is a change in temperature and pressure of the motor fluid 244 and/or the wellbore fluid, the impermeable device 240 may act as a physical barrier to isolate the motor fluid 244 from the wellbore fluid 105. In addition, the impermeable device 240 facilitates to equalize the pressure of the wellbore fluid and the pressure of the motor fluid 244. Further, the impermeable device 240 is flexible to accommodate expansion and contraction of the motor fluid 244 in response to thermal changes in the wellbore.

Figure 3:
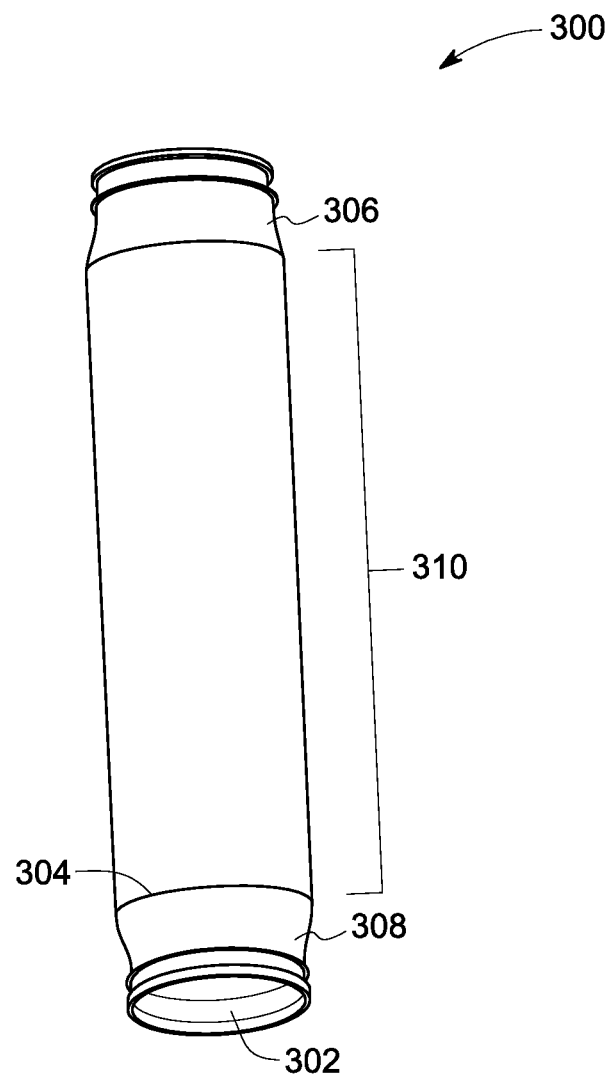
FIG. 3 is a perspective view of a seal bag employed in a seal assembly in accordance with aspects of the present invention.

FIG. 3 illustrates a perspective view of a seal bag 300 in accordance with certain aspects of the present invention. The seal bag 300 is as an elongated cylinder having an inner layer 302, an outer layer 304 and an impermeable layer, such as metal foil, in between. In one embodiment, the inner and outer layers 302, 304 of the seal bag 300 are made of polymers that are capable of expanding and contracting in response to expansion and contraction of the motor fluid. Particularly, the layers 302, 304 of the seal bag 300 are fabricated from an elastomer or other polymers, such as, polytetrafluoroethylene (PTFE), perfluoroalkoxy alkanes (PFA), polyvinyl chloride (PVC), tetrafluoroethylene propylene (Aflas), fluoroelastomer (Viton), and highly saturated nitrile (HSN).

The seal bag 300 includes a first end 306, a second end 308, and a middle section 310. In the illustrated embodiment, a diameter of each of the first and second ends 306, 308 is less than a diameter of the middle section 310 of the seal bag 300. Similar to the previous embodiment, the first and second ends 306, 308 of the seal bag 300 are secured to end plates mounted on the support tube of a shaft.

Figure 4:
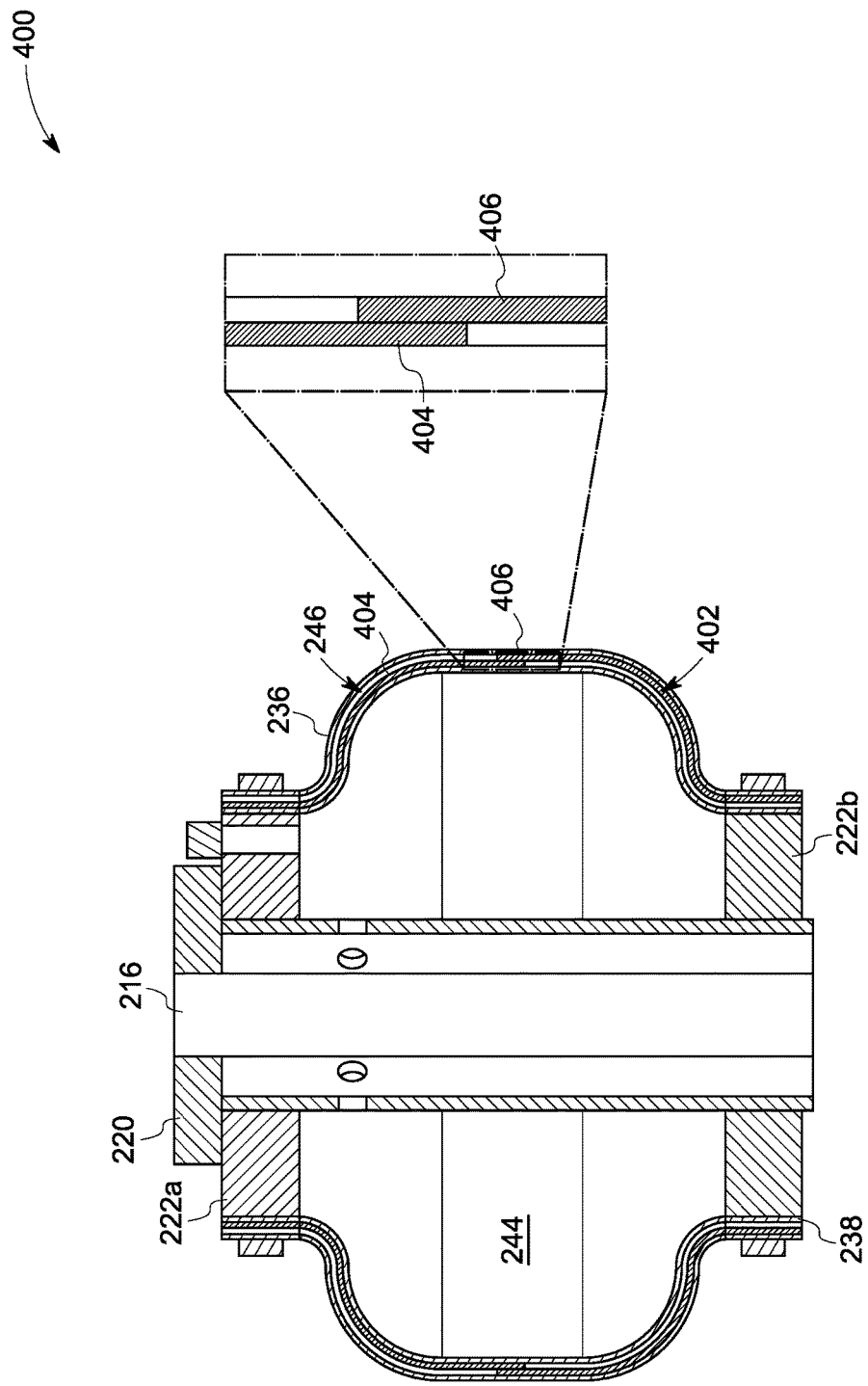
FIG. 4 is a cross-sectional view of a seal assembly in a submersible pumping system in accordance with another embodiment of the present invention.

Referring to FIG. 4, a cross-sectional view of a seal assembly 400 in accordance with another embodiment of the present invention is depicted. The seal assembly 400 is similar to the seal assembly 112 of FIG. 2 except that seal assembly 400 has a metal foil 402 (also referred to as impermeable device) in the second chamber 246. Specifically, the metal foil 402 is a two-piece structure arranged to form a shiplap joint or arrangement. Particularly, the metal foil 402 includes a first segment 404 and a second segment 406. A portion of the first segment 404 and the second segment 406 intersect or overlap each other. Such an arrangement of the metal foil 402 may allow for increased compensation volume of the seal assembly 400. More specifically, the walls of the bag assembly 400 having the shiplap joint of the metal foil 402 can expand/contract much more than possible with a bag assembly having a single continuous metal foil. Also, the first and second bags 236, 238 may have significantly higher compliance than the metal foil 402 embedded in between these bags 236, 238. The impermeable device (metal foil) may also be divided into more than two segments with each segment partially overlapping the adjacent segment in a shiplap fashion to generate additional compliance.

During expansion of the motor fluid 244, the first and second segments 404, 406 of the metal foil 402 slide away from each other to provide space for the expansion of the motor fluid 244. Further, when the motor fluid 244 contracts, the first and second segments 404, 406 may slide towards each other to retain original shape. This shiplap joint or arrangement of the metal foil 402 accommodates a differential thermal expansion between the first and second bags 236, 238 and the metal foil 402 in the second chamber 246. Also, the shiplap arrangement prevents an intersegment gap from forming between the two segments 404, 406 of the metal foil 402 during expansion of the seal assembly 400, thereby the metal foil 402 still acts as an effective impermeable barrier to high temperature water molecules.

Figure 5:
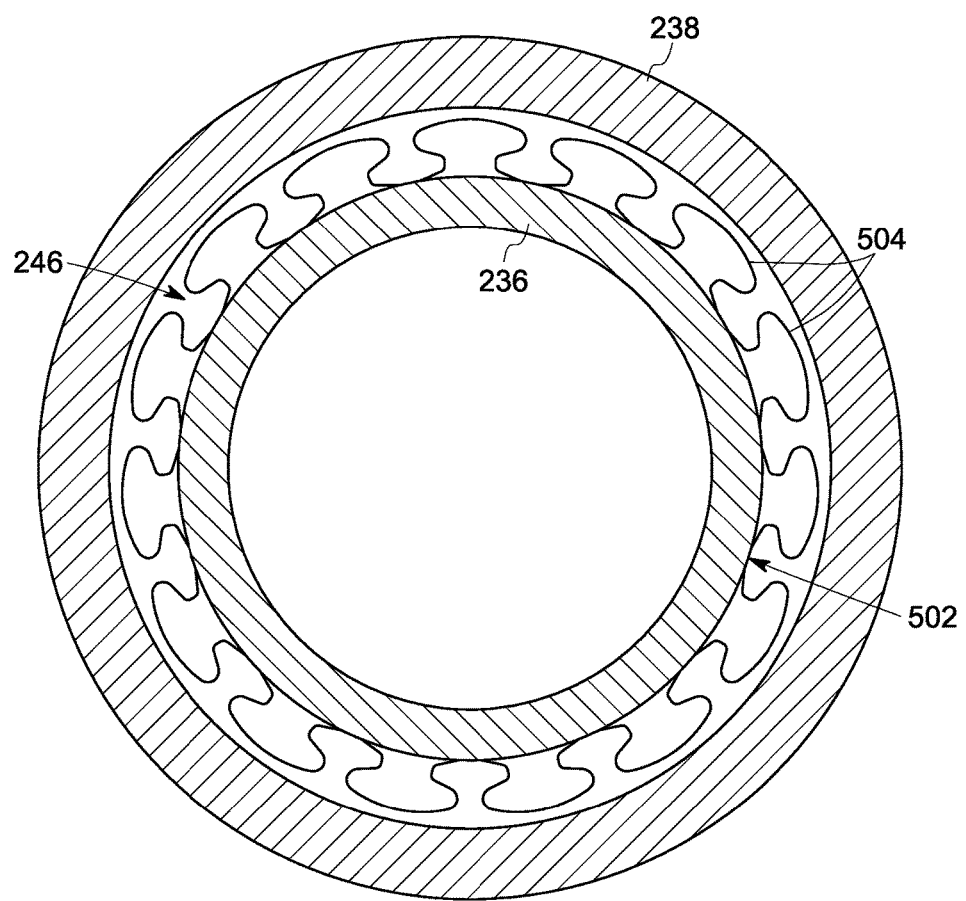
FIG. 5 is a cross-sectional view of a seal assembly in a plane perpendicular to a shaft axis in accordance with yet another embodiment of the present invention.

FIG. 5 illustrates a cross-sectional view of a seal unit in a plane perpendicular to a shaft axis, in accordance with yet another embodiment of the present invention. The seal unit 500 is similar to the seal unit 218 of FIG. 2 except that that the seal unit 500 includes a metal foil 502 (also referred to as impermeable device) in the second chamber 246. Particularly, the metal foil 502 includes a plurality of folded segments 504 positioned surrounding the first bag 236. Further, the second bag 238 is positioned surrounding the folded segments 504. The plurality of folded segments 504 is configured to unfold in response to expansion of the motor fluid and retain original shape in response to contraction of the motor fluid. Additionally, the metal foil 502 ensures that the high temperature water molecules in the wellbore fluid are prevented from diffusing into the motor fluid. Furthermore, the metal foil 502 is capable of accommodating different rates of thermal expansion of the first and second bags 236, 238.

Figure 6:
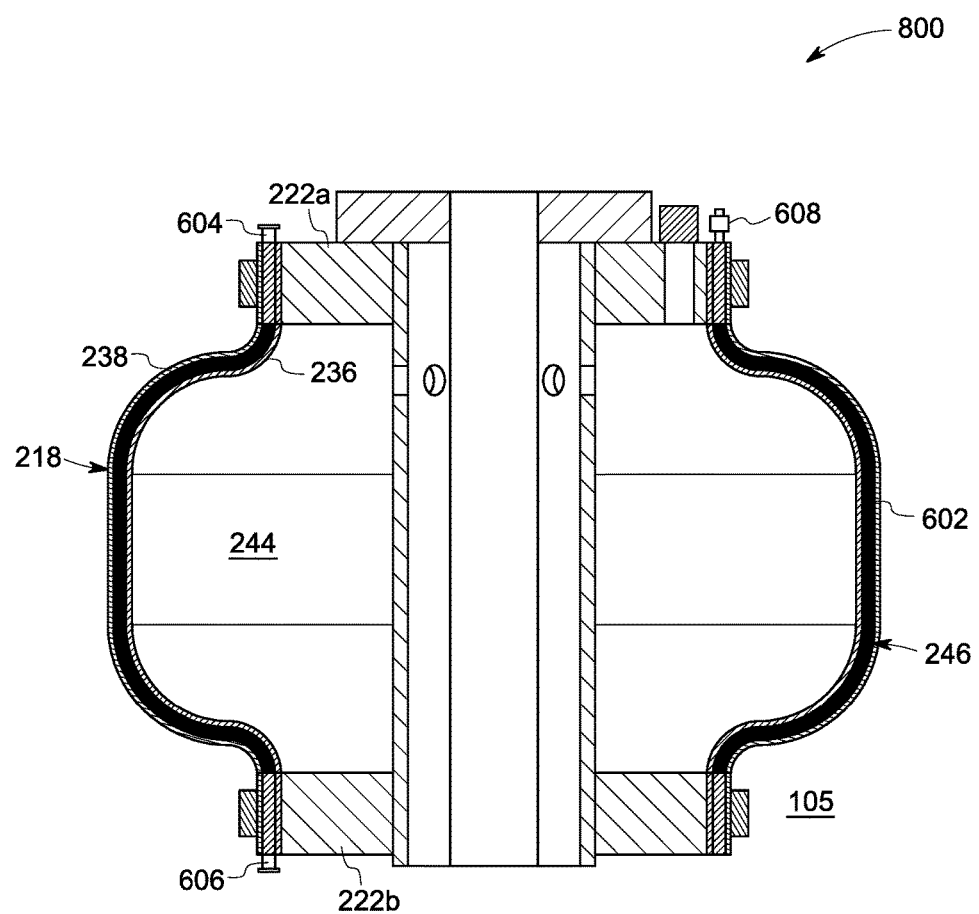
FIG. 6 is a cross-sectional view of a seal assembly in a submersible pumping system in accordance with another embodiment of the present invention.

Referring to FIG. 6, a cross-sectional view of a seal assembly 600, in accordance with the aspects of the present invention is depicted. The seal assembly 600 is similar to the seal assembly 112 of FIG. 2, except that the seal assembly 600 includes a buffer fluid 602 (also referred to as impermeable device) in the second chamber 246. In one example, the buffer fluid 602 may include hydrophobic fluids, such as oils and alkanes that repel the water molecules of the wellbore fluid. In another example, the buffer fluid 602 may include superabsorbent fluids, such as sodium polyacrylate and polyacrylonitrile copolymer that are capable of absorbing the water molecules of the wellbore fluid.

Furthermore, the seal assembly 600 includes an inlet 604 for filling the buffer fluid 602 in the second chamber 246. Similarly, the seal assembly 600 includes an outlet 606 for draining the buffer fluid 602 from the second chamber 246. Also, the seal assembly 600 may include a pressure relief valve 608 for preventing excess pressure buildup in the buffer fluid 602. In one embodiment, the inlet 604, the outlet 606, and the pressure relief valve 608 may be provided in the first and second plates 222a, 222b of the seal assembly 600.

The buffer fluid 602 in the second chamber 246 prevents diffusion of water molecules from the wellbore fluid into the motor fluid 244. In one embodiment, the buffer fluid 602 may include a hydrophobic fluid that repels permeation of the water molecules of the wellbore fluid to the motor fluid 244. In another embodiment, the buffer fluid 602 may include a superabsorbent fluid that absorbs water molecules of the wellbore fluid 105. Additionally, one or more properties of the buffer fluid 602 may be modified by an operator based on deleterious ingredients of the wellbore fluid. The one or more properties may include concentration, volume, and type of the buffer fluid 602. In one embodiment, if the wellbore fluid 105 includes concentrated deleterious ingredients, the volume and/or the concentration of the buffer fluid 602 in the second chamber 246 may be increased. At periodic maintenance intervals, the buffer fluid 602 may be drained and replenished to restore the impermeability of the seal assembly 600 back to its original state.

Figure 7:
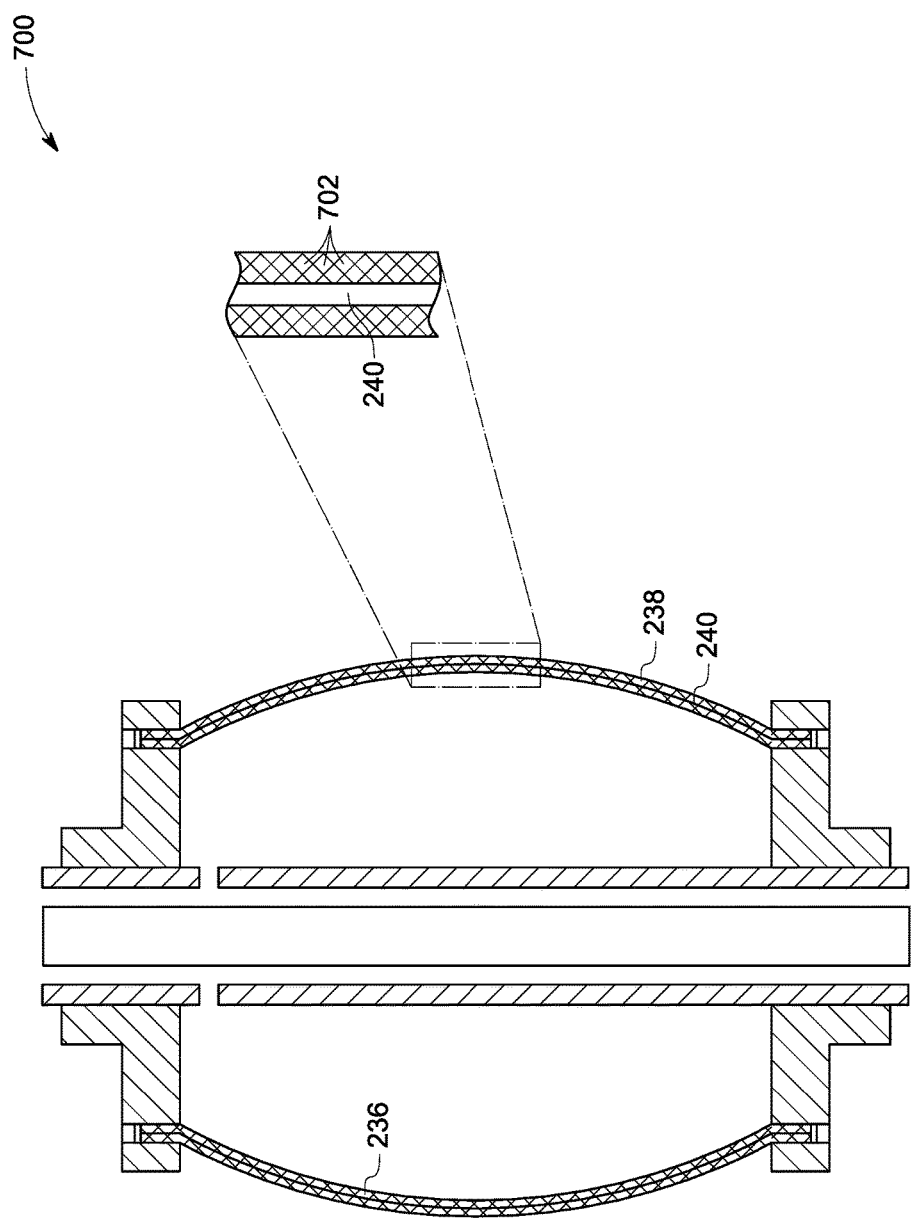
FIG. 7 is a cross-sectional view of a seal assembly in a submersible pumping system in accordance with another embodiment of the present invention.

Referring to FIG. 7, a cross-sectional view of a seal assembly 700 in accordance with another embodiment of the present invention is depicted. The seal assembly 700 is similar to the seal assembly 112 of FIG. 2 except that the first and second bags 236, 238 are fabricated from a plurality of metallic fibers or wires 702. More specifically, the plurality of metallic fibers 702 may be weaved to form a fabric or cloth layer having a predetermined flexibility. It should be noted herein that diameter of the metallic fibers and/or a pattern of weaving of the metallic fibers are selected based on the predetermined flexibility requirements of the first and second bags 236, 238. In one embodiment, the fabric or cloth layer may be wound around the impermeable device, such as the metal foil 240. In another embodiment, the first and second bags 236, 238 may be fabricated from a plurality of non-metallic fibers, such as ceramic fibers and carbon fibers. Particularly, the plurality of non-metallic fibers may be weaved to form a fabric or cloth layer, which is wound around the metal foil 240, for example.

Figure 8:
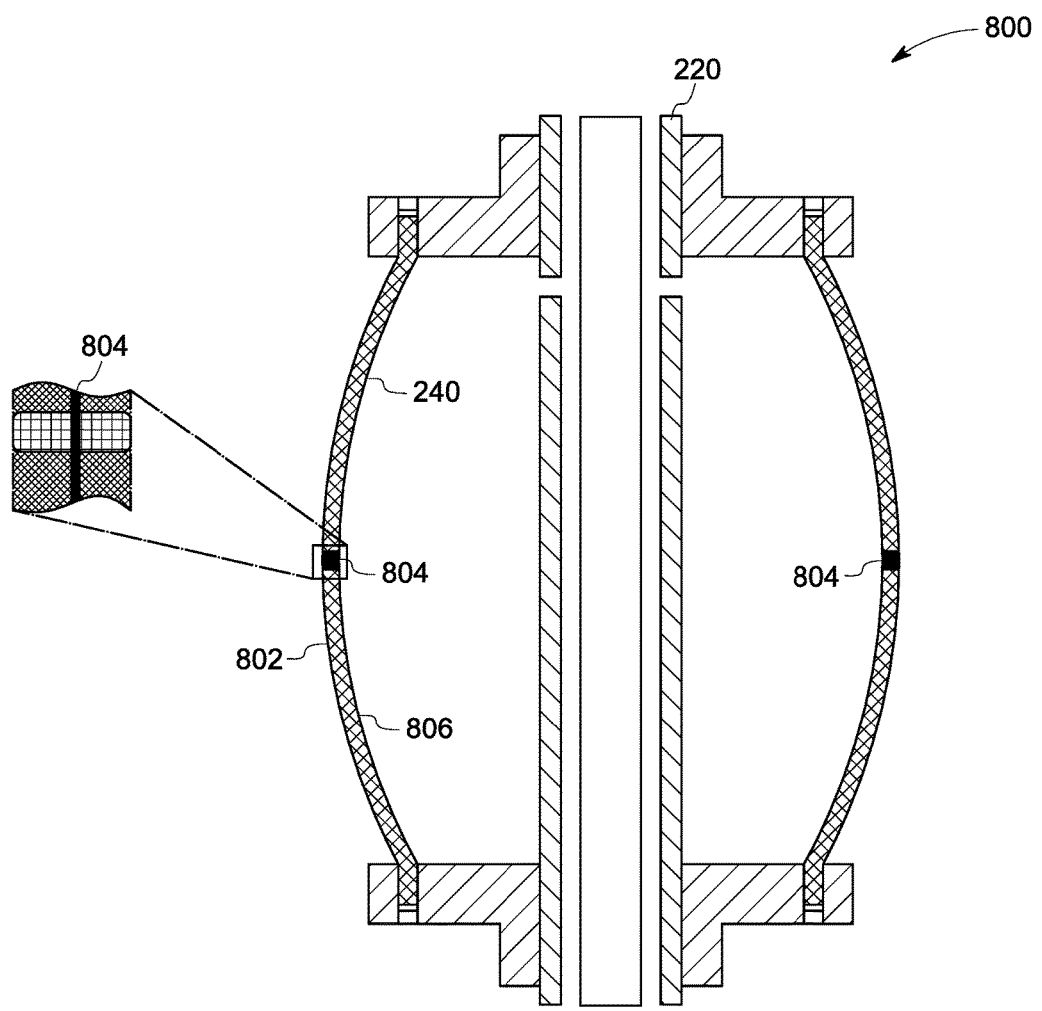
FIG. 8 is a cross-sectional view of a seal assembly in a submersible pumping system in accordance with yet another embodiment of the present invention.

FIG. 8 illustrates a cross-sectional view of a seal assembly 800 in accordance with yet another embodiment of the present invention. The seal assembly 800 is similar to the seal assembly 700 of FIG. 7 except that the seal assembly 800 include only one seal bag 802. The seal bag 802 is positioned surrounding the metal foil 240. Moreover, the metal foil 240 is attached or coupled to the seal bag 802. In one example, the metal foil 240 may be tack welded 804 to the seal bag 802. In another example, the metal foil 240 may be attached or coupled to the seal bag 802 by using one or more attaching techniques such as diffusion bonding, brazing etc. In one embodiment, the seal bag 802 may be positioned on an inner surface 806 of the metal foil. The seal bag 802 may be fabricated from a plurality of metallic or non-metallic fibers.

Figure 9:
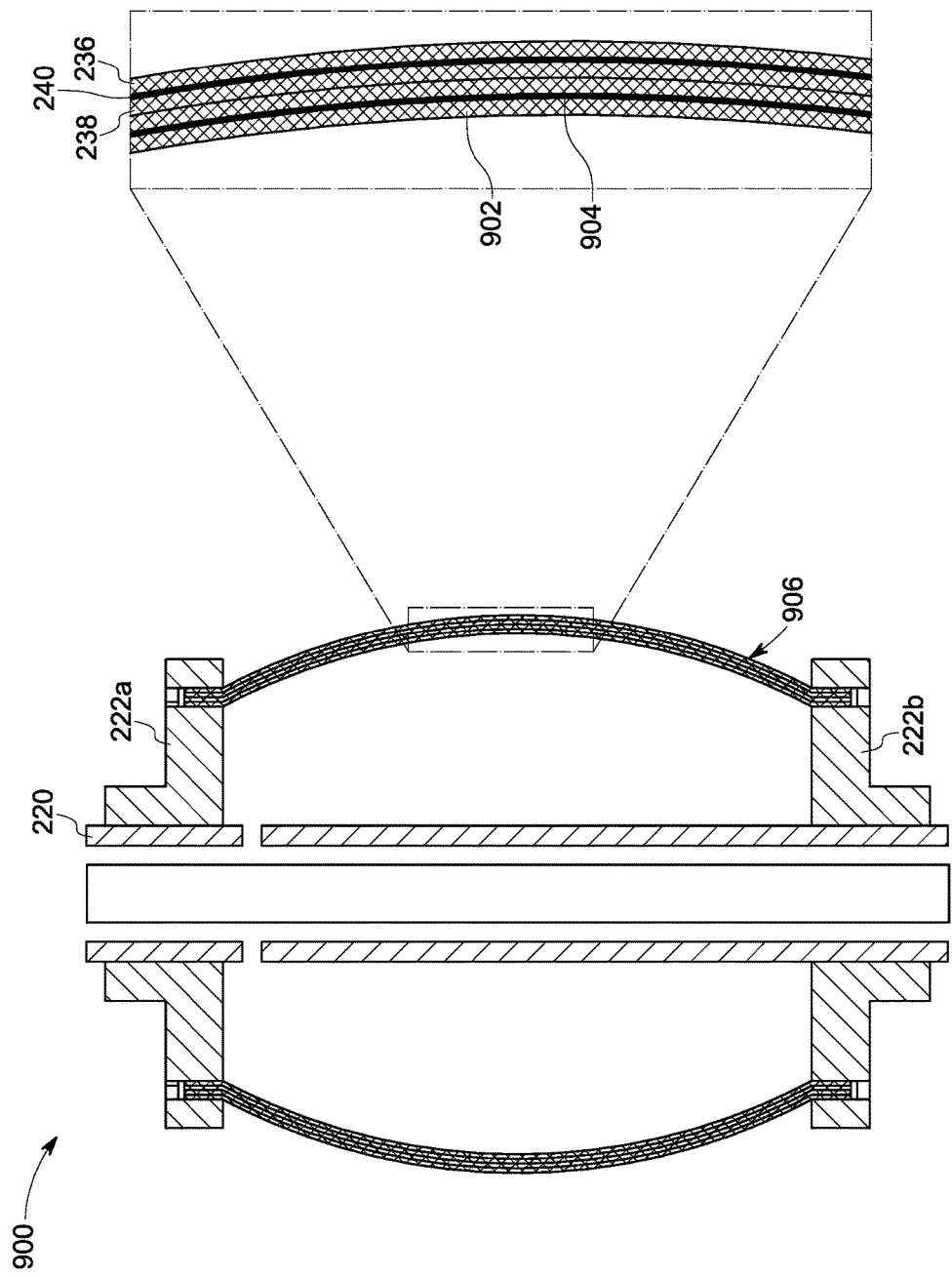
FIG. 9 is a cross-sectional view of a seal assembly in a submersible pumping system in accordance with another embodiment of the present specification.

Referring to FIG. 9, a cross-sectional view of a seal assembly 900 in accordance with another embodiment of the present invention is depicted. The seal assembly 900 is similar to the seal assembly 112 of FIG. 2 except that the seal assembly 900 includes a third bag 902 and an additional impermeable device 904. Particularly, the seal assembly 900 includes the third bag 902 that is positioned surrounding the second bag 238 to define a third chamber 906 between the third bag 902 and the second bag 238. Further, the additional impermeable device 904 is disposed in the third chamber 906 to further restrict the diffusion of high temperature water molecules into the motor fluid. Further, the first, second, and third bags 236, 238, 902 are coupled to the support tube 220, using the first and second plates 222a, 22b. It should be noted herein that the seal assembly 900 may include any number of seal bags and impermeable devices are positioned between adjacent bags. In one embodiment, the bags 236, 238, 902 and the impermeable device 904 may be bonded together continuously or at discrete locations using any of the bonding techniques, such as welding, brazing, diffusion bonding etc.

Figure 10:
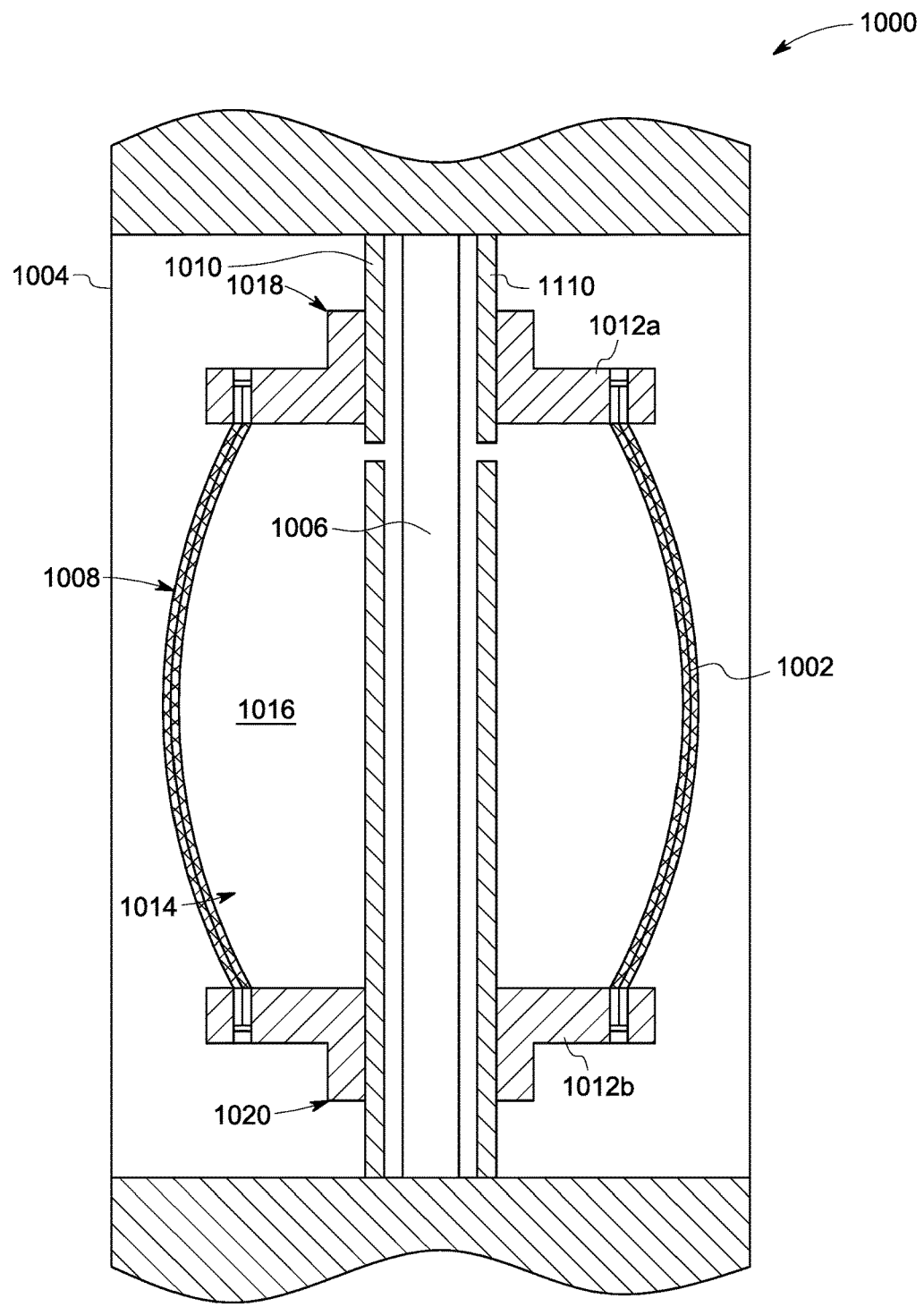
FIG. 10 is a cross-sectional view of a seal assembly having a shape memory alloy in a submersible pumping system in accordance with one embodiment of the present invention.

Referring to FIG. 10, a cross-sectional view of a seal assembly 1000 having a shape memory alloy (SMA) foil 1002 for a submersible pumping system in accordance with an embodiment of the present invention is depicted. The seal assembly 1000 includes a housing 1004, a shaft 1006, a seal unit 1008, a support tube 1010, a first plate 1012a, and a second plate 1012b. It should be noted herein that the seal assembly 1000 may include other components and is not limited to the components shown in FIG. 10.

In the illustrated embodiment, the seal unit 1008 includes the SMA foil 1002 disposed within the housing 1004 of the seal assembly 1000. In one example, the SMA foil 1002 may be fabricated from materials, such as NiTi, NiFeGa, NiTiHf, NiTiPd, NiTiZr. In one embodiment, the SMA foil 1002 is shaped to form a cylindrical hollow tube positioned within the housing 1004. The SMA foil 1002 may have a thickness in a range from about 5 mm to about 20 mm. Moreover, the SMA foil 1002 is capable of expansion and contraction. The SMA foil 1002 is disposed surrounding the support tube 1010 to define a chamber 1014 between the SMA foil 1002 and the support tube 1010. The chamber 1014 contains motor fluid 1016 used to insulate, lubricate and/or cool the electric motor 109 in the motor assembly 110 (shown in FIG. 1).

In the illustrated embodiment, the support tube 1010 is positioned surrounding the shaft 1006. The seal unit 1008 is coupled or secured to the support tube 1010. One end of the seal unit 1008 is coupled to a first end 1018 of the support tube 1010 via the first plate 1012a. Other end of the seal unit 1008 is secured to a second end 1020 of the support tube 1010 via the second plate 1012b.

In the exemplary embodiment, the seal unit 1008 acts as a physical barrier to isolate the motor fluid 1016 from the wellbore fluid. Particularly, the SMA foil 1002 is capable of restricting a flow of the wellbore fluid (including high temperature water molecules) into the motor fluid 1016 even under extreme temperatures and pressure conditions.

During operation of the pumping system, the motor fluid 1016 in the chamber 1014 may expand or contract in response to thermal changes due to startup, shutdown and/or other transients in the wellbore. When the electric motor is started, the motor fluid 1016 in the chamber 1014 may expand due to increase in temperature of the electric motor. In one embodiment, when the electric motor is started, the motor dielectric fluid is heated due to losses associated with transfer of mechanical energy from the motor assembly to the pump assembly. This in turn may heat and expand the motor fluid 1016 in the chamber 1014. As the motor fluid 1016 expands, the SMA foil 1002 also expands to provide space for the expanded motor fluid 1016. In one embodiment, the SMA foil 1002 has a pseudoelasticity property that aids in expansion of the SMA foil 1002 in response to the expansion of the motor fluid 1016. Particularly, the SMA foil 1002 has two forms of crystal structures, such as an austenite structure and a martensite structure. When the SMA foil 1002 is not expanded, the SMA foil 1002 has an austenite structure. When the SMA foil 1002 is expanded, the SMA foil has a martensite structure.

Further, when the motor fluid 1016 expands in the chamber 1014, stress is induced on the austenite structure of the SMA foil 1002. In one example, the induced stress may be in a range from about 30 MPa to about 90 MPa. Such an induced stress may create phase transformation of the SMA foil 1002 from the austenite structure to the martensite structure. Such a property of the SMA foil 1002 is referred to as the pseudoelasticity property. In one embodiment, the SMA foil 1002 may transform from the austenite structure to an intermediate martensite structures and then further to the martensite structure. As a result, the SMA foil 1002 expands to accommodate the expansion of the motor fluid 1016. Moreover, the SMA foil 1002 restricts flow of water molecules of wellbore fluid into the chamber 1014. As a result, contamination of the motor fluid 1016 is prevented.

Further, when the electric motor is shutdown, the motor fluid 1016 in the chamber 1014 contracts due to decrease in temperature of the electric motor. In one embodiment, when the electric motor is shutdown, the temperature around the support tube 1010 and the motor fluid 1016 is reduced causing contraction of the motor fluid 1016 in the chamber 1014. As the motor fluid 1016 contracts, the SMA foil 1002 also contracts to accommodate a change in the volume of the motor fluid 1016. As a result, pressure of the motor fluid 1016 and the pressure of the wellbore fluid are equalized. In one embodiment, when the motor fluid 1016 contracts, the stress induced on the SMA foil 1002 is gradually released. As a result, the SMA foil 1002 may slowly transform from the martensite structure to the austenite structure. Such a transformation causes the SMA foil 1002 to contract and accommodate a change in the volume of the motor fluid 1016. Moreover, even when there is a change in temperature and pressure of the motor fluid 1016 and/or the wellbore fluid, the seal unit 1008 acts as a physical barrier to isolate the motor fluid 1014 from the wellbore fluid.

Figure 11:
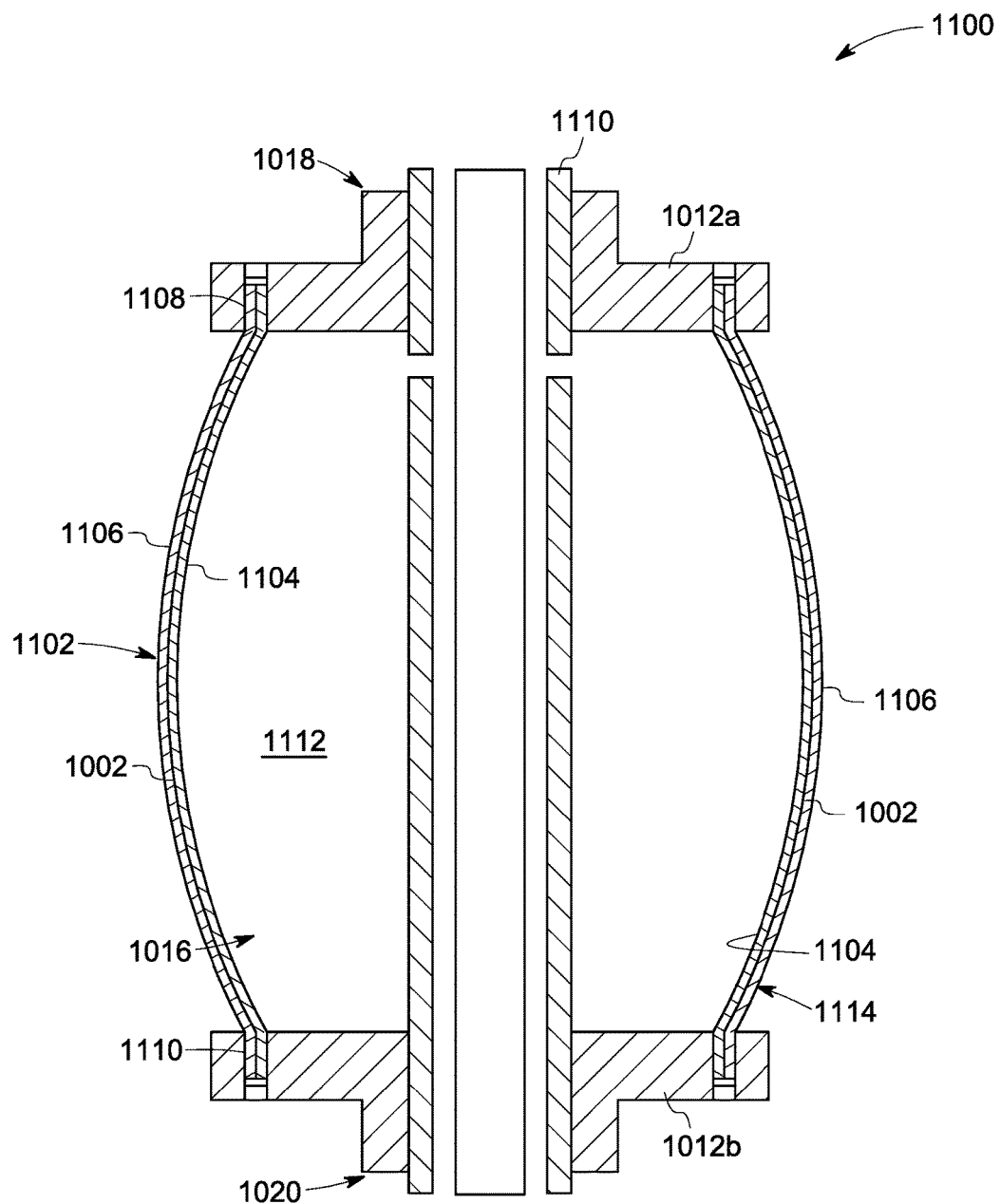
FIG. 11 is a cross-sectional view of a seal assembly having a shape memory alloy in a submersible pumping system, in accordance with another embodiment of the present invention.

Referring to FIG. 11, a cross-sectional view of a seal assembly 1100 having a shape memory alloy (SMA) foil in the submersible pumping system in accordance with one embodiment of the present specification, is depicted. The seal assembly 1100 of FIG. 11 is similar to the seal assembly 1000 of FIG. 10 except that a seal unit 1102 of FIG. 11 includes a first bag 1104 and a second bag 1106 on opposite sides of the SMA foil 1002. Particularly, the first bag 1104 is positioned on an inner surface of the SMA foil 1002, while the second bag 1106 is positioned on an outer surface of the SMA foil 1002. Further, a first end 1108 of the first and second bags 1106, 1104 is sealed to the upper head 1018 of the support tube 1110 by using a first plate 1012*a*. Similarly, a second end 1110 of the first and second bags 1106, 1104 is sealed to the second end 1020 of the support tube 1110 by using a second plate 1012*b*.

Furthermore, by sealing or attaching the first bag 1104 to the support tube 1110, a first chamber 1112 is formed between the first bag 1104 and the support tube 1110. This first chamber 1112 is used for storing the motor fluid 1016. In a similar fashion, by sealing or attaching the second bag 1106 to the support tube 1110, a second chamber 1114 is formed between the second bag 1106 and the first bag 1104. Further, the SMA foil 1002 is positioned between the first bag 1104 and the second bag 1106 to restrict the flow of the wellbore fluid into the motor fluid 1016 in the first chamber 1112. It may be noted that first and second bags 1104, 1106 are used to provide additional structural support to the SMA foil 1002. In one example, the first and second bags 1104, 1106 may have a thickness in a range from about 5 mm to about 20 mm.

During thermal changes in the wellbore 104, the SMA foil 1102 in conjunction with the first and second bags 1104, 1106 may expand and contract in response to expansion and contraction of the motor fluid 1016 in the first chamber 1112. More importantly, SMA foil 1102 may expand and contract without any plastic deformation to the structure of the SMA foil 1102. Also, the SMA foil 1102 may ensure that the wellbore fluid 104 does not permeate through the seal bag 1102.

Figure 12:
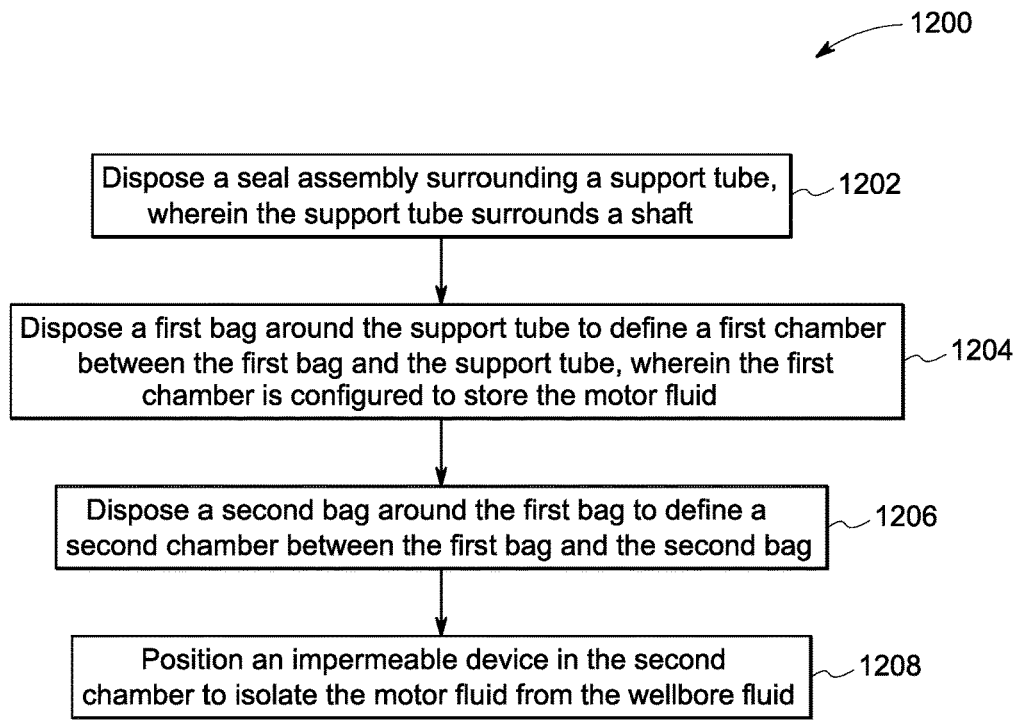
FIG. 12 is a flow chart illustrating a method for installing seal assembly in accordance with one embodiment of the present invention.

Referring to FIG. 12, a flow chart illustrating a method 1200 for installing a seal assembly for a submersible pumping system in accordance with an exemplary embodiment of the present invention is depicted. At step 1202, a seal assembly is disposed surrounding a support tube. Also, the support tube 220 is used to house or surround a shaft 216.

Subsequently, at step 1204, a first bag is disposed around the support tube to define a first chamber between the first bag and the support tube. Particularly, the first bag is positioned surrounding the support tube. A first end of the first bag is coupled to a first end of the support tube via a first plate. Similarly, a second end of the first bag is coupled to a second end of the support tube via a second plate. The first chamber is used for containing a motor fluid. The motor fluid is used in an electric motor for insulating, lubricating or cooling the electric motor.

Furthermore, at step 1206, a second bag is disposed around the first bag to define a second chamber between the first bag and the second bag. Particularly, the second bag is positioned surrounding the first bag. A first end of the second bag is coupled to the first end of the support tube via the first plate. Similarly, a second end of the second bag is coupled to the second end of the support tube via the second plate.

At step 1208, an impermeable device is positioned in the second chamber and configured to isolate the motor fluid from the wellbore fluid. Particularly, the impermeable device may include a metal foil or a buffer fluid that is configured to expand and contract in response to expansion and contraction of the motor fluid. As a result, the impermeable device is configured to provide space to accommodate the change in volume of the motor fluid. In addition, the metal foil or the buffer fluid is configured to act as a physical barrier between the first bag and the second bag to restrict the flow of the wellbore fluid to the motor fluid stored in the first chamber. Further, the impermeable device is configured to equalize the pressure of the motor fluid with the pressure of the wellbore fluid.

In accordance with the exemplary embodiment, the impermeable device is configured to isolate the motor fluid with the wellbore fluid even when there is a change in temperature and pressure of the motor fluid and/or the wellbore fluid.

Figure 13:
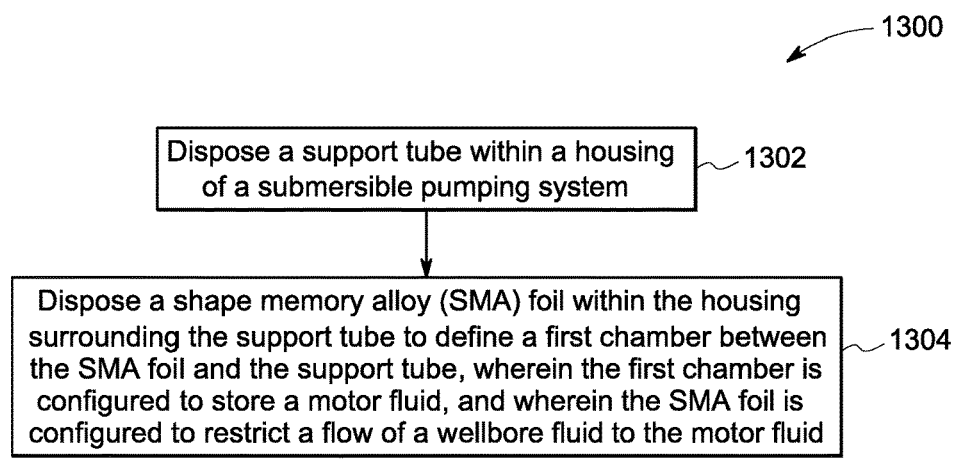
FIG. 13 is a flow chart illustrating a method for installing a seal assembly in accordance with another embodiment of the present invention.

Referring to FIG. 13, a flow chart illustrating a method 1300 for installing a seal assembly of a submersible pumping system in accordance with an exemplary embodiment of the present invention is depicted. At step 1302, a support tube is disposed within a housing of the submersible pumping system. Also, the support tube is used to house or surround a shaft.

At step 1304, a shape memory alloy (SMA) foil is disposed within the housing surrounding the support tube to define a first chamber between the SMA foil and the support tube. The first chamber may be configured to contain the motor fluid. In one example, the SMA foil is shaped to form a cylindrical hollow tube positioned within the housing. Further, a first end of the SMA foil is coupled to a first end of the support tube via a first plate. Similarly, a second end of the SMA foil is coupled to a second end of the support tube via a second plate. The SMA foil may have a thickness in a range from about 5 mm to about 20 mm. Moreover, the SMA foil may be configured to restrict a flow of a wellbore fluid to the motor fluid.

In accordance with the exemplary embodiments discussed herein, the exemplary sealing system facilitates to isolate the motor fluid from the wellbore fluid. Additionally, the exemplary sealing system facilitates to restrict the flow of wellbore fluid into the motor fluid even under extreme temperature and pressure conditions. Further, the exemplary sealing system facilitates to accommodate expansion and contraction of the motor fluid as the electric motor undergoes thermal cycles during operation.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A seal assembly comprising:
a housing;
a support tube disposed within the housing; and
a shape memory alloy foil disposed within the housing, surrounding the support tube;
a first bag positioned on an inner surface of the shape memory alloy foil surrounding the support tube to define a first chamber between the first bag and the support tube, wherein the first chamber is configured to store a motor fluid; and
a second bag positioned surrounding an outer surface of the shape memory alloy foil to define a second chamber between the first bag and the second bag,
wherein the shape memory alloy foil is positioned in the second chamber between the first and second bags and configured to restrict a flow of a wellbore fluid to the motor fluid.

2. The seal assembly of claim 1, wherein the shape memory alloy foil comprises:
a first end aligned with a first end of the support tube; and
a second end aligned with a second end of the support tube.

3. The seal assembly of claim 2, further comprising:
a first plate coupled to the first end of the shape memory alloy foil and the first end of the support tube; and
a second plate coupled to the second end of the shape memory alloy foil and the second end of the support tube.

4. The seal assembly of claim 1, wherein at least one of the first and second bags has a thickness in a range of 5 mm to 20 mm.

5. The seal assembly of claim 1, wherein the shape memory alloy foil has a thickness in a range of 0.5 mm to 3 mm.

6. The seal assembly of claim 1, wherein the shape memory alloy foil, the first bag, and the second bag are configured to expand in response to expansion of the motor fluid in the first chamber.

7. The seal assembly of claim 6, wherein the shape memory alloy foil, the first bag, and the second bag, are configured to contract in response to contraction of the motor fluid in the first chamber.

8. A method comprising
disposing a support tube within a housing;
disposing a shape memory alloy foil within the housing, surrounding the support tube;
positioning a first bag on an inner surface of the shape memory alloy foil surrounding the support tube to define a first chamber between the first bag and the support tube, wherein the first chamber is configured to store a motor fluid; and
positioning a second bag surrounding an outer surface of the shape memory alloy foil to define a second chamber between the first bag and the second bag,
wherein disposing the shape memory alloy foil comprises positioning the shape memory alloy foil in the second chamber between the first and second bags to restrict a flow of a wellbore fluid to the motor fluid.

9. The method of claim 8, further comprising:
aligning a first end of the shape memory alloy foil with a first end of the support tube; and
aligning a second end of the shape memory alloy foil with a second end of the support tube.

10. The method of claim 9, further comprising:
coupling a first plate to the first end of the shape memory alloy foil and the first end of the support tube; and
coupling a second plate to the second end of the shape memory alloy foil and the second end of the support tube.

11. A submersible pumping system comprising:
an electric motor;
a pump coupled to the electric motor and configured to pump a wellbore fluid; and
a seal assembly positioned between the pump and the electric motor, wherein the seal assembly comprises:
a housing;
a support tube disposed within the housing; and
a shape memory alloy foil disposed within the housing, surrounding the support tube;
a first bag positioned on an inner surface of the shape memory alloy foil surrounding the support tube to define a first chamber between the first bag and the support tube, wherein the first chamber is configured to store a motor fluid; and
a second bag positioned surrounding an outer surface of the shape memory alloy foil to define a second chamber between the first bag and the second bag,
wherein the shape memory alloy foil is positioned in the second chamber between the first and second bags and configured to restrict a flow of a wellbore fluid to the motor fluid.

12. The submersible pumping system of claim 11, wherein the shape memory alloy foil comprises:
   a first end aligned with a first end of the support tube; and
   a second end aligned with a second end of the support tube.

13. The submersible pumping system of claim 12, further comprising:
   a first plate coupled to the first end of the shape memory alloy foil and the first end of the support tube; and
   a second plate coupled to the second end of the shape memory alloy foil and the second end of the support tube.

14. The submersible pumping system of claim 11, wherein at least one of the first and second bags has a thickness in a range of 5 mm to 20 mm.

15. The submersible pumping system of claim 11, wherein the shape memory alloy foil has a thickness in a range of 0.5 mm to 3 mm.

16. The submersible pumping system of claim 11, wherein the shape memory alloy foil, the first bag, and the second bag are configured to expand in response to expansion of the motor fluid in the first chamber.

17. The submersible pumping system of claim 11, wherein the shape memory alloy foil, the first bag, and the second bag are configured to contract in response to contraction of the motor fluid in the first chamber.

18. The submersible pumping system of claim 11, wherein the first bag and the second bag are configured to further provide structural support to the shape memory alloy foil.

19. The seal assembly of claim 1, wherein the first bag and the second bag are configured to further provide structural support to the shape memory alloy foil.

20. The method of claim 8, further comprising providing structural support to the shape memory alloy foil using the first bag and the second bag.

* * * * *